United States Patent
Schapler et al.

(10) Patent No.: US 9,026,455 B2
(45) Date of Patent: May 5, 2015

(54) METHODS AND SYSTEMS FOR PROCESSING STOCK IN A STORAGE FACILITY

(75) Inventors: Daniela Schapler, St. Leon Rot (DE); Tobies Adler, Viernheim (DE); Joachim Epp, Zuzenhausen (DE)

(73) Assignee: SAP AG, Walldorf (DE)

( * ) Notice: Subject to any disclaimer, the term of this patent is extended or adjusted under 35 U.S.C. 154(b) by 2585 days.

(21) Appl. No.: 10/846,116

(22) Filed: May 14, 2004

(65) Prior Publication Data

US 2005/0256775 A1   Nov. 17, 2005

(51) Int. Cl.
- G06Q 10/00 (2012.01)
- G06Q 10/08 (2012.01)
- G06Q 20/20 (2012.01)
- G06F 7/00 (2006.01)

(52) U.S. Cl.
CPC ............ G06Q 10/087 (2013.01); G06Q 20/203 (2013.01)

(58) Field of Classification Search
CPC ............... B65G 1/1376; B65G 1/1373; B65G 2201/0258; B65G 2209/08; G05D 2201/0216; G05D 1/0022
USPC ........... 235/385; 422/67; 700/2, 95, 216, 302; 705/9, 29
See application file for complete search history.

(56) References Cited

U.S. PATENT DOCUMENTS

| | | | | |
|---|---|---|---|---|
| 4,542,808 A * | 9/1985 | Lloyd et al. | | 186/56 |
| 4,796,209 A * | 1/1989 | Burk | | 700/302 |
| 5,434,490 A * | 7/1995 | Ishida et al. | | 318/587 |
| 5,825,149 A * | 10/1998 | Matsumoto et al. | | 318/587 |
| 5,886,634 A * | 3/1999 | Muhme | | 340/572.1 |
| 6,289,260 B1 * | 9/2001 | Bradley et al. | | 700/216 |
| 6,351,685 B1 * | 2/2002 | Dimitri et al. | | 700/214 |
| 6,421,579 B1 * | 7/2002 | Dimitri et al. | | 700/214 |
| 6,463,360 B1 * | 10/2002 | Terada et al. | | 700/257 |
| 6,622,127 B1 * | 9/2003 | Klots et al. | | 705/28 |
| 6,748,292 B2 * | 6/2004 | Mountz | | 700/214 |
| 6,883,710 B2 * | 4/2005 | Chung | | 235/385 |
| 7,139,637 B1 * | 11/2006 | Waddington et al. | | 700/216 |
| 7,991,505 B2 * | 8/2011 | Lert et al. | | 700/214 |
| 2002/0070862 A1 * | 6/2002 | Francis et al. | | 340/572.1 |
| 2003/0036935 A1 * | 2/2003 | Nel | | 705/7 |
| 2003/0083964 A1 * | 5/2003 | Horwitz et al. | | 705/28 |

* cited by examiner

Primary Examiner — Ryan Zeender
Assistant Examiner — Dana Amsdell
(74) Attorney, Agent, or Firm — Finnegan, Henderson, Farabow, Garrett & Dunner LLP

(57) ABSTRACT

Systems and methods are disclosed for processing stock. The systems and methods may include identifying at least a first transfer order, a second transfer order, a first processing unit order, and a second processing unit order. In addition, the systems and methods may include creating an initial work order based at least on the first transfer order and the second transfer order. Furthermore, the systems and methods may include detecting the handling of the first transfer order by a first processing unit and the handling of the second transfer order by a second processing unit, and associating the first transfer order and the second transfer order with the first processing unit order and the second processing unit order respectively.

27 Claims, 8 Drawing Sheets

METHODS AND SYSTEMS FOR PROCESSING STOCK IN A STORAGE FACILITY

BACKGROUND OF THE INVENTION

I. Field of the Invention

The present invention generally relates to processing stock. More particularly, the present invention relates to methods and systems for processing stock in a storage facility.

II. Background Information

With conventional stock processing systems, stock is segregated into stock bundles or containers. A group of stock bundles may comprise one order. When loading or unloading the stock bundles, a warehouse operator transfers the stock bundles, one at a time, from one location to another until the order is completely transferred. For example, the warehouse operator may use a manual hand truck to lift and move individual stock bundles from a staging area to a transportation vehicle or visa versa.

Some orders may contain a large number of stock bundles. Because some orders may be too large for one warehouse operator to transfer, multiple warehouse operators may be employed. In conventional systems, when multiple warehouse operators are employed, a portion of the stock bundles comprising the order may be assigned to a first warehouse operator and the remained portion of bundles may be assigned to a second warehouse operator. For example, stock bundles numbered 1 through 50 may be assigned to the first warehouse operator and stock bundles numbered 51 through 100 may be assigned to the second warehouse operator.

Using multiple warehouse operators is problematic. This is because each warehouse operator, when selecting a bundle to transfer, must search through and inspect the remaining bundles to make sure the bundle selected is one assigned to the particular warehouse operator. This searching and inspecting process is time consuming and creates great inefficiencies in conventional stock processing systems at least because the stock bundles are randomly arranged in, for example, the staging area. Moreover, conventional stock processing systems do not monitor the progress and performance of multiple warehouse operators loading or unloading stock bundles.

In view of the foregoing, there is presently a need for improved systems and methods for processing stock in a storage facility. Further, there is a need for improved systems and methods for processing stock in a storage facility that allow for monitoring the progress and performance of multiple warehouse operators loading or unloading stock bundles.

SUMMARY OF THE INVENTION

Consistent with embodiments of the present invention, systems and methods are disclosed for processing stock in a storage facility.

In accordance with one embodiment, a method for processing stock comprises identifying at least a first transfer order, a second transfer order, a first processing unit order, and a second processing unit order, creating an initial work order based at least on the first transfer order and the second transfer order, detecting the handling of the first transfer order by a first processing unit and the handling of the second transfer order by a second processing unit, and associating the first transfer order and the second transfer order with the first processing unit order and the second processing unit order, respectively.

According to another embodiment, a system for processing stock comprises a memory storage for maintaining a database and a processing unit coupled to the memory storage, wherein the processing unit is operative to identify at least a first transfer order, a second transfer order, a first processing unit order, and a second processing unit order, create an initial work order based at least on the first transfer order and the second transfer order, detect the handling of the first transfer order by a first processing unit and the handling of the second transfer order by a second processing unit, and associate the first transfer order and the second transfer order with the first processing unit order and the second processing unit order, respectively.

In accordance with yet another embodiment, a computer-readable medium comprises a set of instructions which when executed perform a method for processing stock, the method comprising identifying at least a first transfer order, a second transfer order, a first processing unit order, and a second processing unit order, creating an initial work order based at least on the first transfer order and the second transfer order, detecting the handling of the first transfer order by a first processing unit and the handling of the second transfer order by a second processing unit, and associating the first transfer order and the second transfer order with the first processing unit order and the second processing unit order, respectively.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
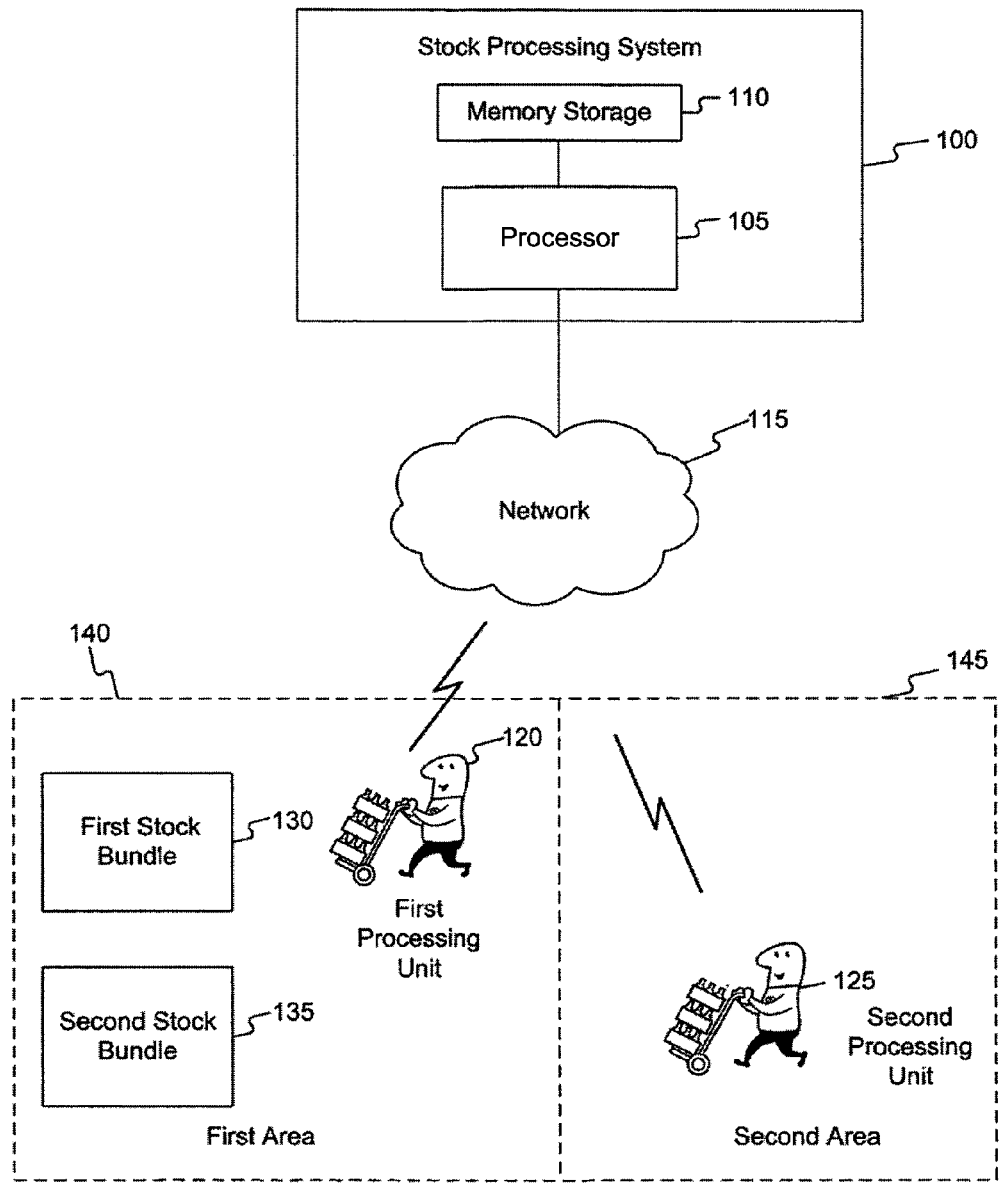
FIG. 1 is a block diagram including an exemplary stock processing system, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with the invention may be implemented for processing stock in a storage facility. Consistent with the invention, stock may be moved by processing units from a first area to a second area. For example, the first area may comprise a warehouse or other storage facility and the second area may comprise a truck or group of trucks to be loaded. Alternately, the first area may comprise a truck or group of trucks to be unloaded and the second area may comprise a warehouse or other storage facility. The aforementioned areas are exemplary and other types of areas may be used. Furthermore, the stock to be moved may be segregated into a plurality of stock bundles, with each stock bundle having a different transfer order associated with it. The transfer order associated with a particular stock bundle may identify an individual stock item or a plurality of items comprising the stock bundle. The plurality of stock bundles may be placed randomly within the first area and comprise a single order.

An initial work order may be included in embodiments consistent with the invention. The initial work order may include links. Particular links may go from the initial work order to particular transfer orders associated with particular stock bundles within the plurality of stock bundles. A plurality of processing units may be used to transfer the stock bundles from the first area to the second area. Particular transfer orders associated with particular stock bundles may indicate particular areas within the second area where the corresponding particular stock bundles should be placed. For example, a transfer order may indicate which truck among a plurality of trucks in the second area the corresponding stock bundle should be placed.

As particular processing units transfer or otherwise process the stock bundles, the particular processing units may communicate with a stock processing system. For example, the particular processing units may communicate to the stock processing system which particular stock bundles each processing unit is processing or has processed. As the particular processing units process particular bundles, the transfer orders associated with the processed bundles may become associated with processing unit orders. The processing unit orders are associated with the particular processing unit that processed the particular stock bundles. For example, when a stock bundle is processed, the stock processing system may remove a link to the initial work order and create a link to the processing unit order. Moreover, the stock processing system may monitor the performance of the processing units in processing the stock bundles.

An embodiment consistent with the invention may comprise a system for processing stock in a storage facility. The system may comprise a memory storage for maintaining a database and a processing unit coupled to the memory storage operative to identify at least a first transfer order, a second transfer order, a first processing unit order, and a second processing unit order. The processing unit may be further operative to create an initial work order based at least on the first transfer order and the second transfer order and associate the first transfer order and the second transfer order with the first processing unit order and the second processing unit order, respectively.

Consistent with an embodiment of the present invention, the aforementioned memory storage and processing unit may be implemented in a stock processing system, such as an exemplary stock processing system 100 of FIG. 1. Any suitable combination of hardware, software, and/or firmware may be used to implement the memory storage and processing unit. The aforementioned system 100 is exemplary and other systems may comprise the aforementioned stock processing system, consistent with embodiments of the present invention.

By way of a non-limiting example, FIG. 1 illustrates system 100 in which the features and principles of the present invention may be implemented. As illustrated in FIG. 1, system 100 may include a processor 105 and a memory storage 110. System 100 may be configured to communicate over a network 115 with a first processing unit 120 and a second processing unit 125. First processing unit 120 may be configured to transfer a first stock bundle 130 associated with a first transfer order (not shown in FIG. 1) from a first area 140 to a second area 145. Similarly, second processing unit 125 may be configured to transfer a second stock bundle 135 associated with a second transfer order (not shown in FIG. 1) from first area 140 to second area 145. The first and second transfer orders will be described in greater detail below with respect to FIGS. 4A through 4C. Furthermore, first stock bundle 130 and second stock bundle 135 may be randomly arranged within first area 140.

As noted above, FIG. 1 illustrates an exemplary implementation of the invention. For instance, while FIG. 1 shows two stock bundles 130 and 135, systems consistent with the invention may be used when processing larger numbers of stock bundles. For example, first and second processing units 120 and 125 may transfer the stock of hundreds or an number of stock bundles. Moreover, systems consistent with the invention may manage stock transfers performed by larger numbers of processing units beyond the two processing units 120 and 125 shown in FIG. 1.

First processing unit 120 or second processing unit 125 may comprise a motorized vehicle, a non-motorized vehicle, a truck, a forklift, a fork truck, a pallet jack, a dolly, or a hand truck. The aforementioned devices are exemplary and first processing unit 120 and second processing unit 125 may comprise other types of devices for handling and moving stock. Moreover, first processing unit 120 and second processing unit 125 may be controlled or otherwise used by a storage facility operator or other persons. In addition, first processing unit 120 and second processing unit 125 may comprise robotic devices controlled by system 100.

First processing unit 120, second processing unit 125 (the "processing units"), and system 100, may include a personal computer, network computer, mainframe, or other similar microcomputer-based workstation. System 100 and the processing units may though comprise any type of computer operating environment, such as hand-held devices, multiprocessor systems, microprocessor-based or programmable sender electronic devices, minicomputers, mainframe computers, and the like. System 100 and the processing units may also be practiced in distributed computing environments where tasks are performed by remote processing devices. Furthermore, any of the processing units and system 100 may include a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processing units and system 100 may comprise other systems or devices.

Network 115 may comprise, for example, a local area network (LAN) or a wide area network (WAN). Such networking environments are commonplace in offices, enterprise-wide computer networks, intranets, and the Internet. When a LAN is used as network 115, a network interface located at any of system 100 and the processing units may be used to interconnect any of system 100 and the processing units. When network 115 is implemented in a WAN networking environment, such as the Internet, system 100 and the processing units may typically include an internal or external modem or other means for establishing communications over the WAN. Further, in utilizing network 115, data sent over network 115 may be encrypted to insure data security by using known encryption/decryption techniques.

In addition to utilizing a wire line communications system as network 115, a wireless communications system, or a combination of wire line and wireless may be utilized as network 115 in order to, for example, communicate information or instructions, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio and spread spectrum radio. The processing units or system 100 in the wireless environment may be any mobile terminal, such as the mobile terminals described above. Wireless data may include, but is not limited to, paging, text messaging, e-mail, Internet access and other specialized data applications specifically excluding or including voice transmission.

System 100 and the processing units may also transmit data by methods and processes other than, or in combination with, network 115. These methods and processes may include, but are not limited to, transferring data via, diskette, CD ROM, facsimile, conventional mail, an interactive voice response system (IVR), or via voice over a publicly switched telephone network.

Figure 2:
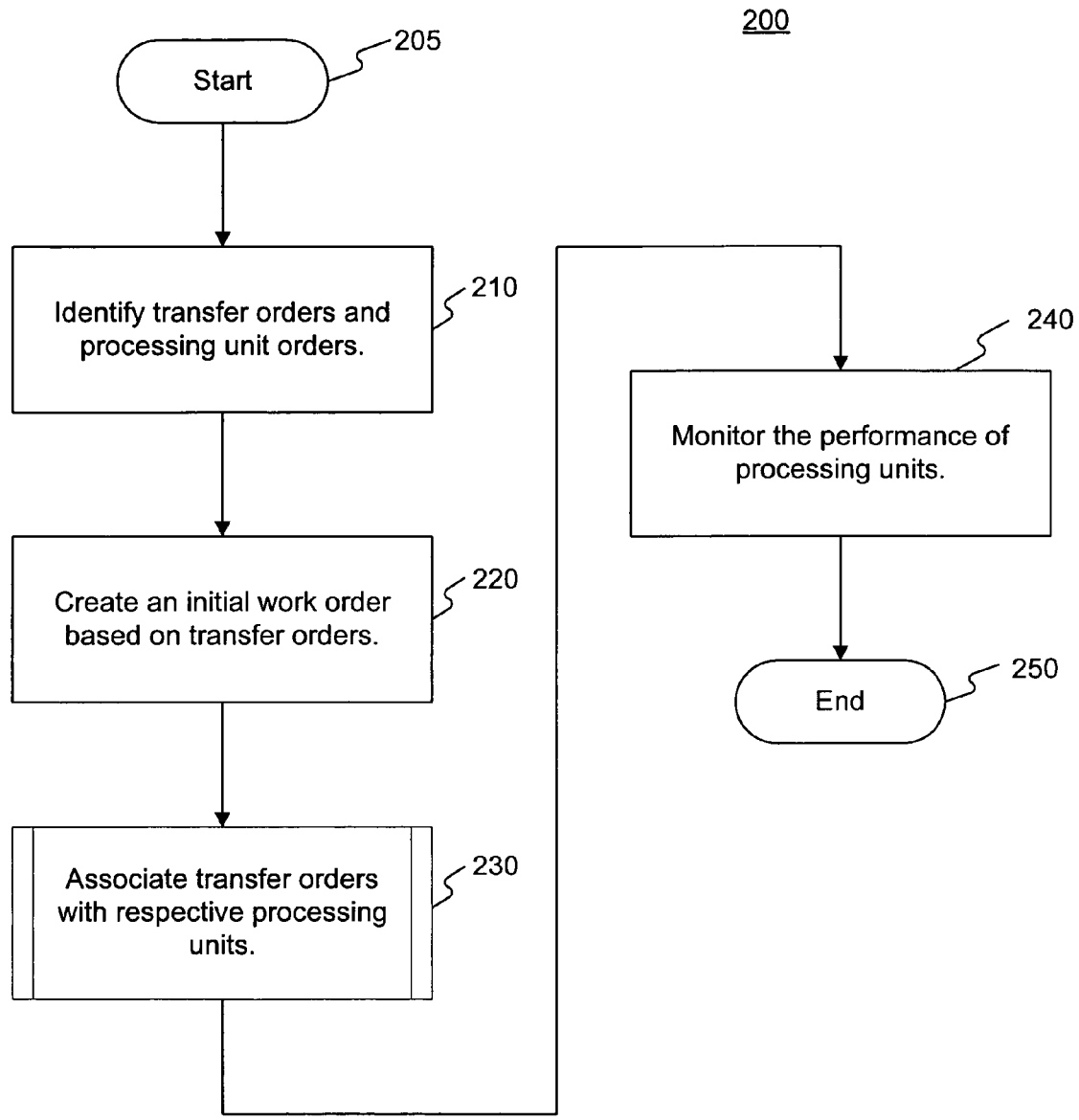
FIG. 2 is a flow chart of an exemplary method for processing stock, consistent with an embodiment of the present invention.
Figure 4A:
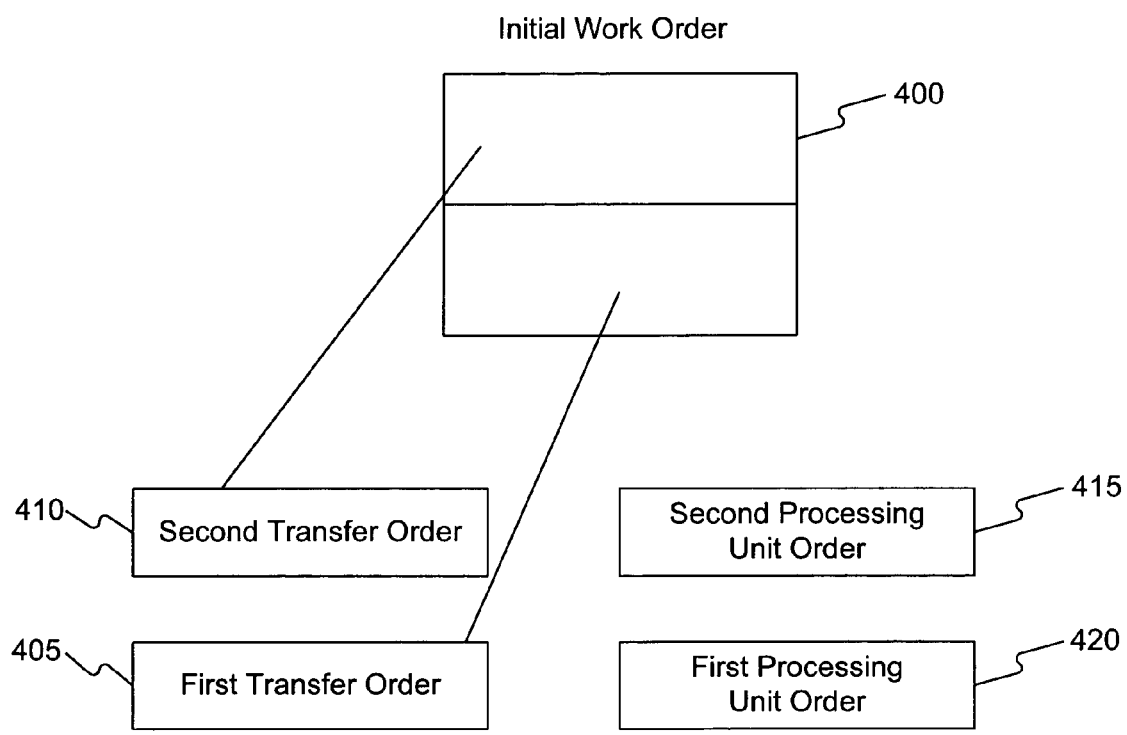
FIGS. 4A through 4C are block diagrams illustrating links between transfer orders, an initial work order, and processing unit orders, consistent with an embodiment of the present invention.

FIG. 2 is a flow chart setting forth the general stages involved in an exemplary method for processing stock in a storage facility, consistent with the invention. Exemplary ways to implement the stages of method 200 will be described in greater detail below. Exemplary method 200 may begin at starting block 205 and proceed to stage 210 where system 100 may identify transfer orders and processing unit orders. For example, system 100 may identify a first transfer order 405, a second transfer order 410, a first processing unit order 415, and a second processing unit order 420, as shown in FIG. 4A. First transfer order 405 and second transfer order 410 may be respectively associated with first stock bundle 130 and second stock bundle 135. First transfer order 405 may identify an individual stock item or a plurality of items comprising first stock bundle 130 and second transfer order 410 may identify an individual stock item or a plurality of items comprising second stock bundle 135. First processing unit order 415 and second processing unit order 420 may be associated with respective processing units, such as first processing unit 120 and second processing unit 125.

From stage 210, where system 100 identifies transfer orders and processing unit orders, exemplary method 200 may continue to stage 220 where system 100 may create an initial work order based on the identified transfer orders. As shown in FIG. 4A, for example, system 100 may create an initial work order 400 and link first transfer order 405 and second transfer order 410 to initial work order 400. Initial work order 400, first transfer order 405, second transfer order 410, and their associated links may be maintained in a database included in memory storage 110 in system 100. The initial work order may comprise a temporary allocation of the transfer orders to a work order used before knowing which processing unit will handle which transfer orders. During processing of the transfer orders by the processing units, a final work order may be created via the links made between the transfer orders and the processing unit orders.

After system 100 creates an initial work order based on the transfer orders at stage 220, exemplary method 200 may then advance to exemplary subroutine 230 where system 100 may associate transfer orders with respective processing units. As part of this subroutine, system 100 may track which processing unit handles which transfer order. In other words, when a processing unit transfers or otherwise handles the stock associated with a particular transfer order, the processing unit becomes associated with that transfer order. When a processing unit becomes associated with a transfer order, a corresponding work order may then be created for that association. Subroutine 230 may thus create work orders "on the fly" for corresponding processing units and transfer orders, allowing for more efficient handling of the stock associated with those transfer orders.

Figure 3:
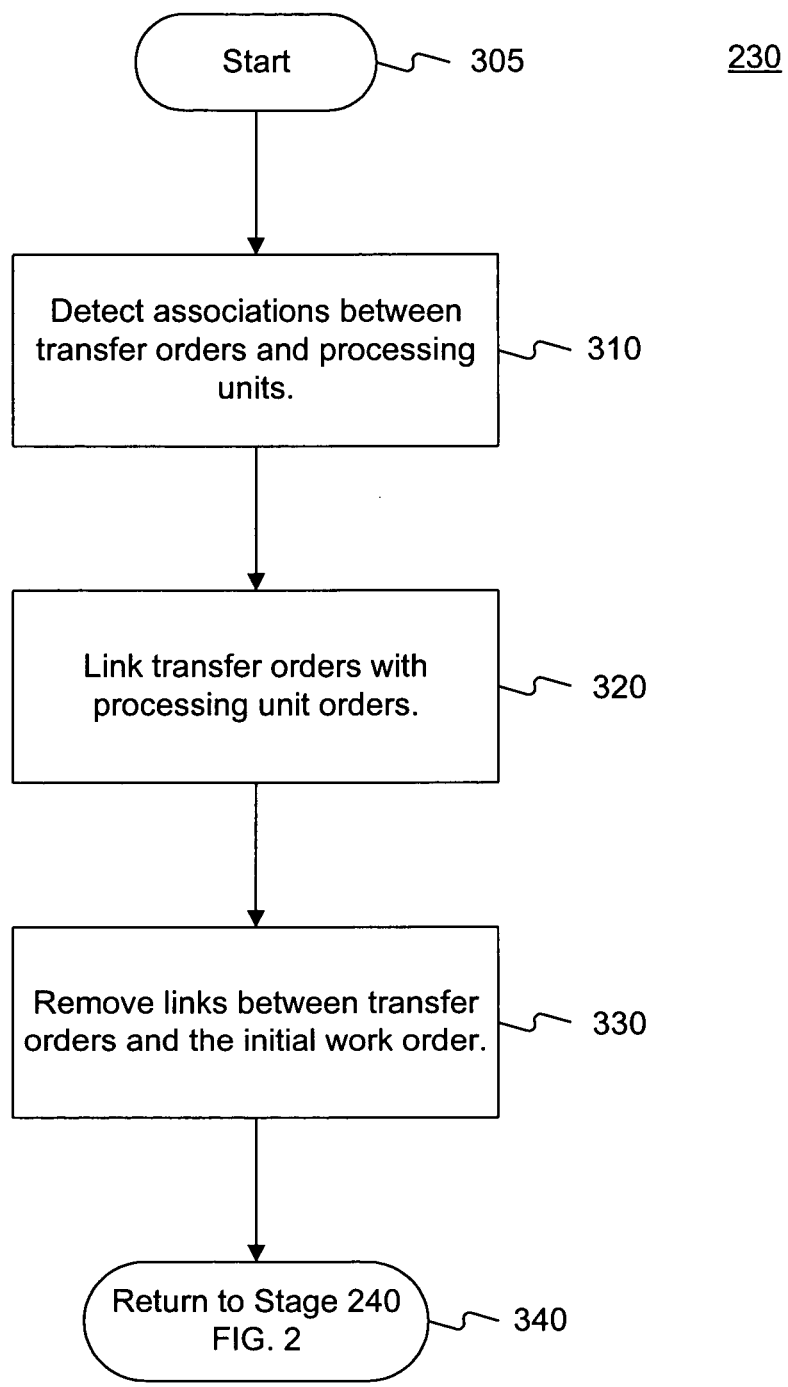
FIG. 3 is a flow chart of an exemplary subroutine that may be used in the exemplary method of FIG. 2 for associating transfer orders with respective processing units, consistent with an embodiment of the present invention.
Figure 4B:
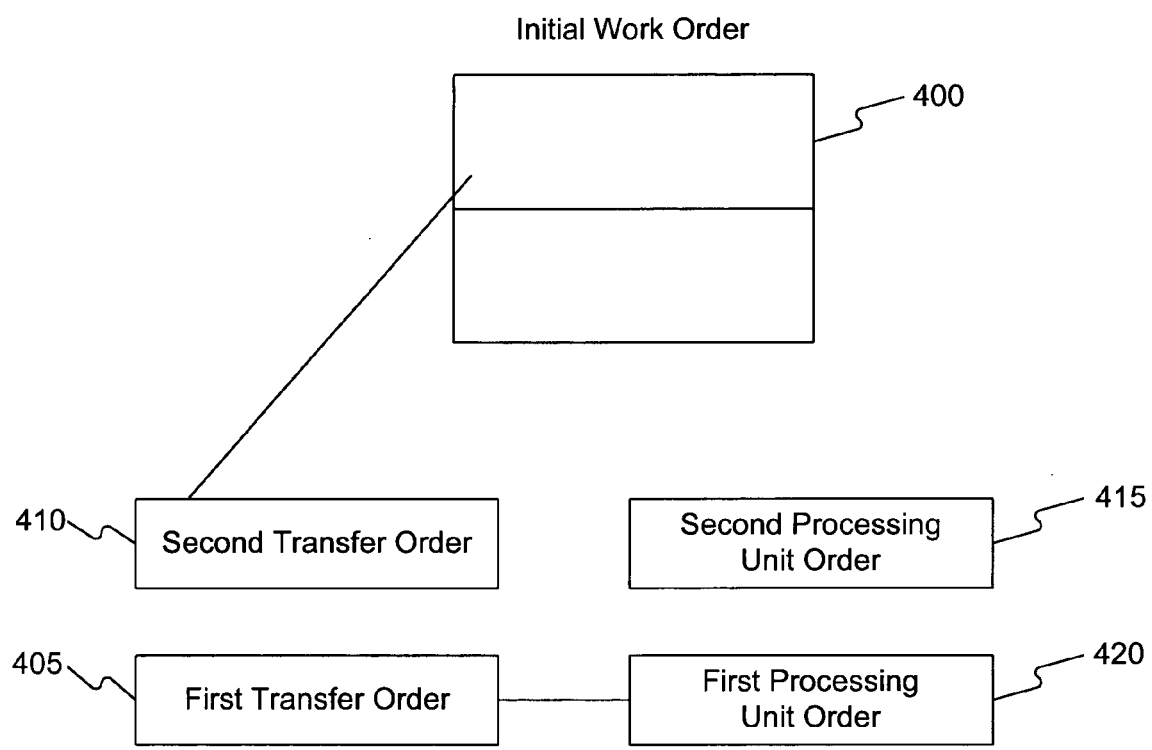
Figure 4C:
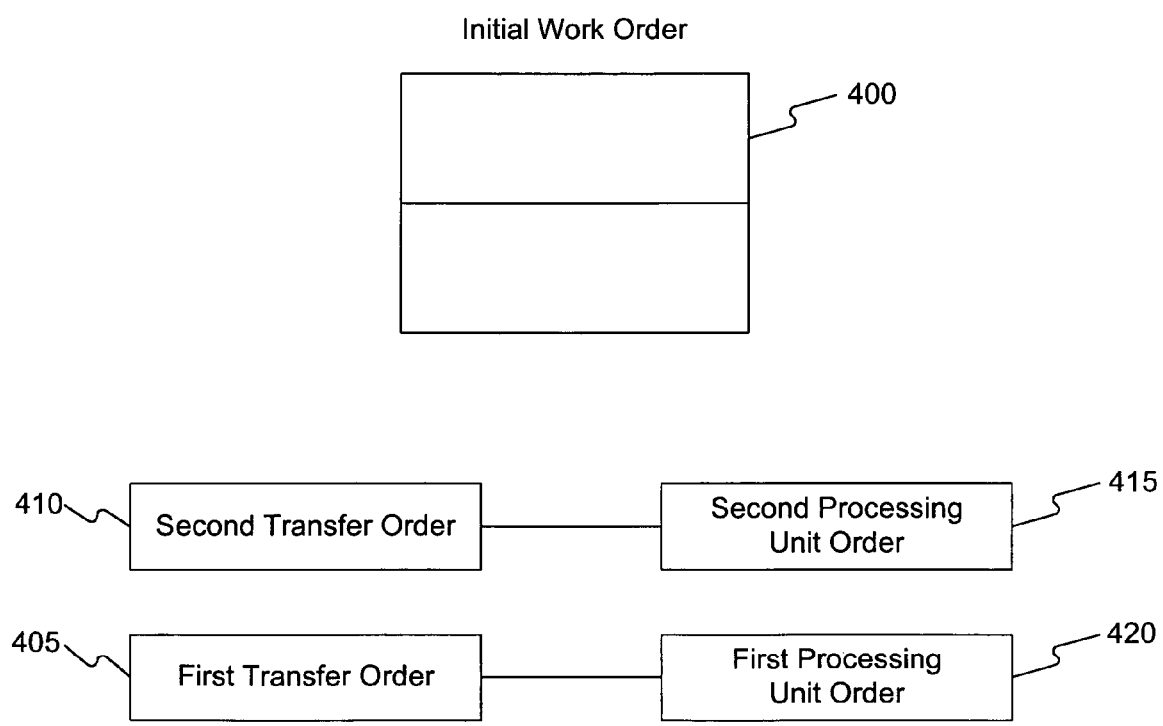

As described in more detail with respect to FIGS. 4B and 4C, system 100 may associate first transfer order 405 and second transfer order 410 with first processing unit order 420 and second processing unit order 415, respectively. As shown in FIG. 4C, for example, system 100 may link first transfer order 405 to first processing unit order 420 and may link second transfer order 410 to second processing unit order 415. Each link may represent a work order. First transfer order 405, second transfer order 410, first processing unit order 420, second processing unit order 415, and their associated links (and/or work orders) may be maintained in a database included in memory storage 110 in system 100. Furthermore, system 100 may remove links (shown in FIG. 4A) between initial work order 400 and first transfer order 405 and second transfer order 410. In accordance with one embodiment, the stages of exemplary subroutine 230 are described in greater detail below with respect to FIG. 3.

Once system 100 associates transfer orders with respective processing units in exemplary subroutine 230, method 200 may proceed to stage 240 where system 100 may monitor the performance of the processing units. For example, system 100 may monitor the transfer of first stock bundle 130 and second stock bundle 135 from first area 140 to second area 145. Based on the monitored performance, system 100 may reallocate first processing unit 120 or second processing unit 125. For example, if system 100 detects that most or all of the stock to be transferred from first area 140 has been transferred to second area 145, system 100 may reallocate first processing unit 120 or second processing unit 125 to other areas of the storage facility. In other words, because system 100 may monitor the completion or processing of work orders "on the fly," system 100 may provide a real time indication of how much of the project has been completed. A manager could, for example, look on a screen connected to system 100 to see the current status level. Based upon other tasks requiring the use of the processing units, the system alone or in conjunction with the manager, could thus better plan for the reallocation of processing units. Decisions regarding reallocations may be communicated to the processing units via network 115.

Figure 5A:
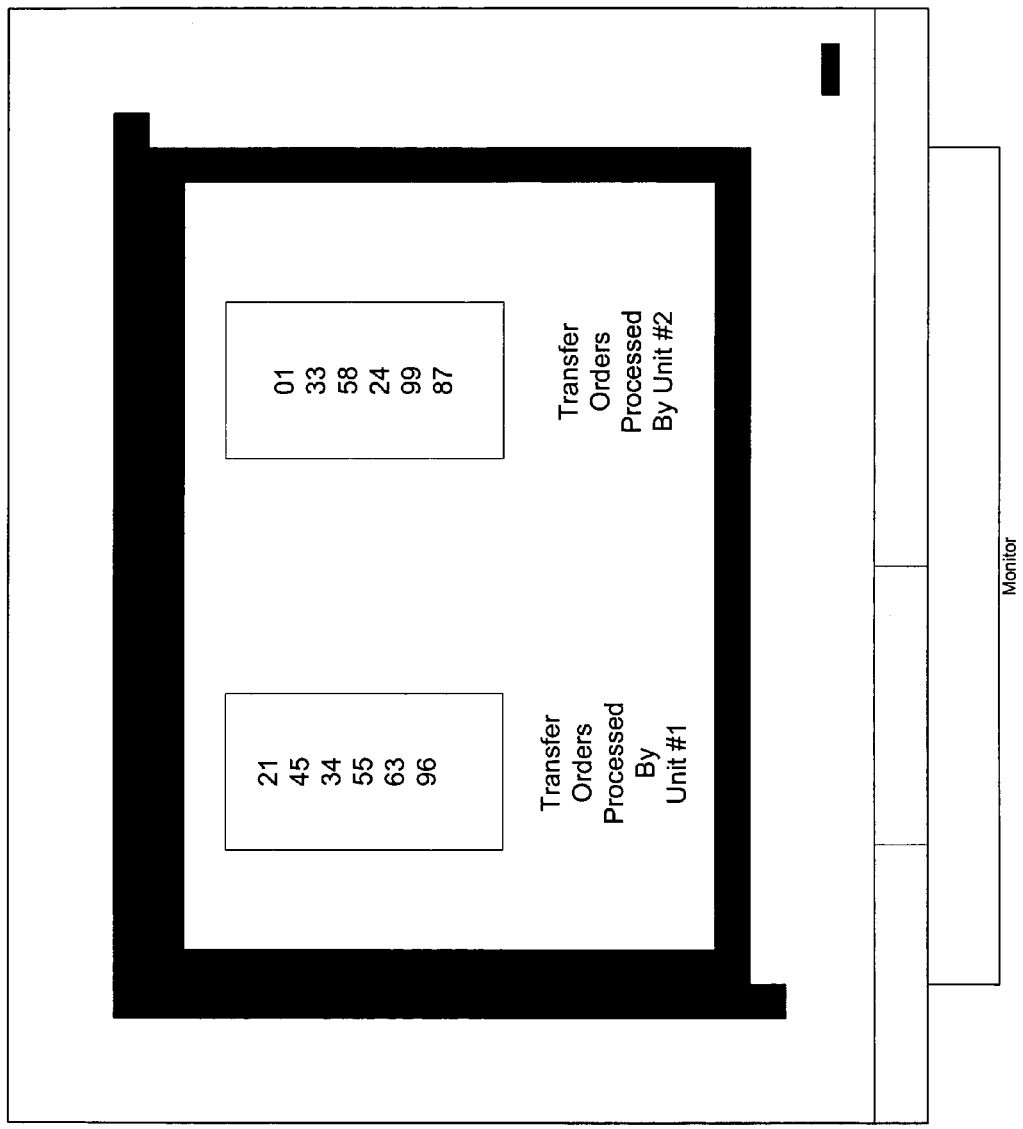
FIGS. 5A and 5B are screen shots illustrating exemplary displays for performance monitoring, consistent with an embodiment of the present invention.
Figure 5B:
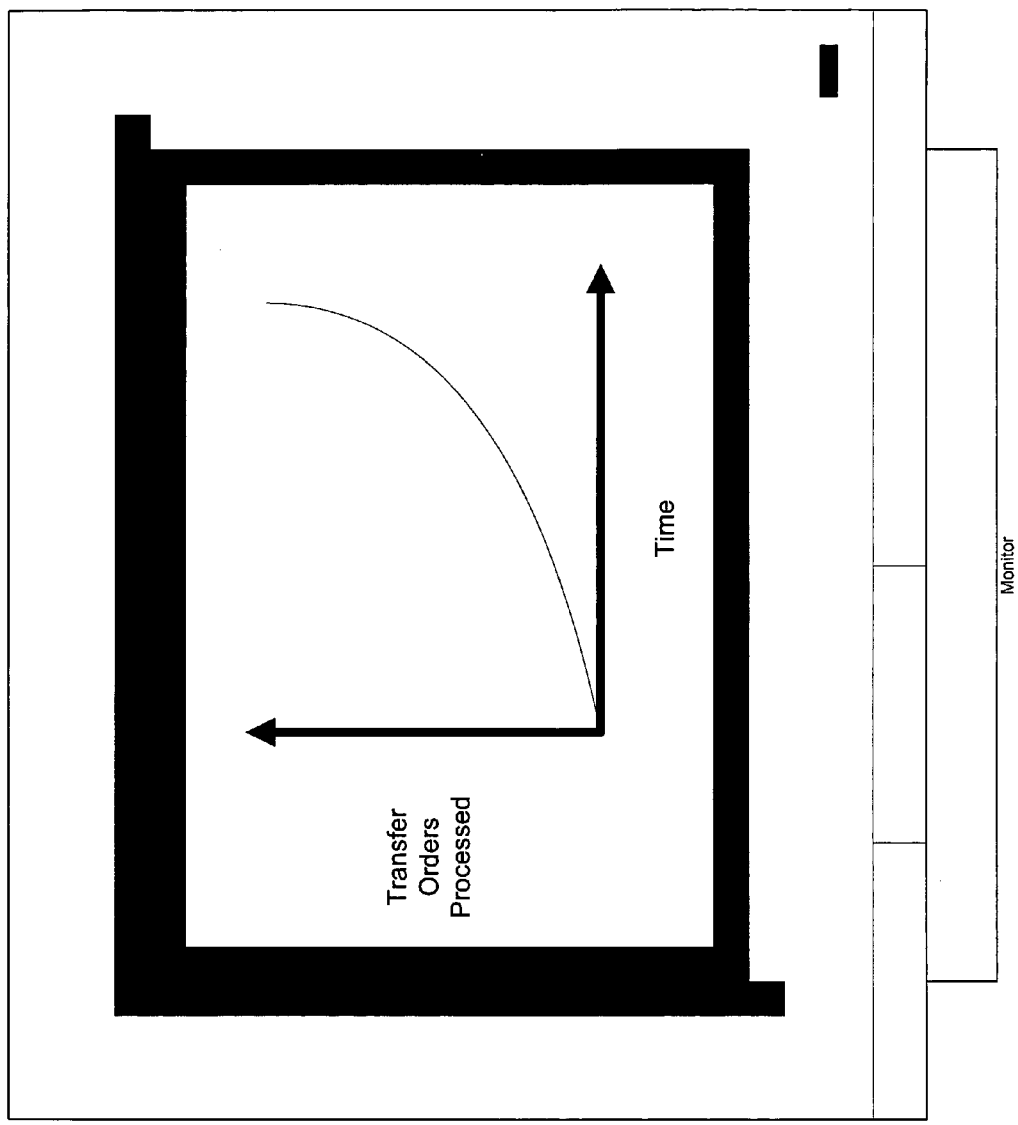

Furthermore, system 100 may monitor the performance of an operator operating first processing unit 120 or second processing unit 125 by recording and evaluating, for example, the accuracy, speed, or volume of work performed. For example, a screen connected to system 100 may display the graph shown in FIG. 5A. As shown in FIG. 5A, a warehouse manager can accurately correlate the particular stock or transfer orders handled by each processing unit. In addition, the screen may display the graph shown in FIG. 5B. As shown in FIG. 5B, warehouse manager can see how fast the work orders were completed at least because system 100 can detect when the associations or links were made. Moreover, system 100 may maintain a database showing which processing unit processed which stock bundle in case it is determined latter, for example, that any of the bundles were damaged or mishandled. From stage 240, where system 100 may monitor the performance of processing units, exemplary method 200 ends at stage 250.

To monitor the performance of the processing units, various approaches and features may be used. For example, in one embodiment, each processing unit may register or report stock handling and processing activities to system 100 via network 115, such as the pick-up or delivery of a stock bundle to a location. Conventional technologies may be used to report or register stock handling activities. For instance, when a stock bundle is picked-up or dropped at a location, a bar code label or radio frequency identification (RFID) tag on the stock bundle and/or associated with the location may read and transmitted via network 115 to system 100. The activity information may then be stored in memory storage 110 and analyzed by processor 105 to facilitate performance monitoring. Other features may also be used, such as the stock visibility features disclosed in the U.S. patent application entitled "Methods and Systems for Managing Stock" (U.S. patent application Ser. No. 10/873,272), which is incorporated herein by reference.

FIG. 3 is a flow chart setting forth the general stages involved in exemplary subroutine 230 for associating transfer orders with respective processing units. Ways to implement the stages of exemplary subroutine 230 will be described in greater detail below. Exemplary subroutine 230 may begin at starting block 305 and proceed to stage 310, where system 100 may detect associations between transfer orders and processing units. For example, system 100 may detect an association between first transfer order 405 and first processing unit 120 when first stock bundle 130, which is associated first transfer order 405, is processed by first processing unit 120. Processing stock bundles may comprise transferring stock bundles from first area 140 to second area 145.

When, for example, first processing unit 120 processes a stock bundle (e.g., bundle 130), first processing unit 120 may send a first signal to system 100 through network 115. The first handling signal may include a first stock identifier identifying first stock bundle 130. In addition, the first signal may indicate that first processing unit 120 has processed or is processing first stock bundle 130.

In producing the first handling signal, first processing unit 120 may read a bar code or RFID tag associated with, e.g., first stock bundle 130. For example, first processing unit 120 may include a device capable of reading a bar code or an RFID. To this end, a person operating first processing unit 120 may cause first processing unit 120 to read a bar code or RFID associated with first stock bundle 130. Alternately, first processing unit 120 may automatically read a bar code or RFID tag associated with first stock bundle 130 when it comes in close proximity to first stock bundle 130. The aforementioned bar code and RFID are exemplary and other methods may be used to encode and obtain data from the stock bundles in order to allow detection of handling or processing of that stock bundle by a particular processing unit.

System 100 may receive the first handling signal that may include the first stock identifier. Handling signals may be communicated within system 100 using wire line or wireless communications, or a combination of the two, including the types of data communications described above with respect to network 115 of FIG. 1. System 100 may then query a database in memory storage 110 using the first stock identifier in the first handling signal and, for example, associate first stock bundle 130 with first transfer order 405 from the resulting query. As a result, system 100 may detect an association between first transfer order 405 and first processing unit 120 when processing first stock bundle 130.

Similarly, system 100 may detect an association between second transfer order 410 and second processing unit 125 when second stock bundle 135, which is associated the second transfer order 410, is processed by second processing unit 125. When processing second stock bundle 135, second processing unit 125 may send a second handling signal to system 100 through network 115. The second handling signal may include a second stock identifier identifying second stock bundle 135. In addition, the second signal may indicate that second processing unit 125 has processed or is processing second stock bundle 135.

In producing the second handling signal, second processing unit 125 may read a bar code or an RFID tag associated with second stock bundle 135, as described above with respect to the first handling signal. Also similar to the first handling signal, system 100 may receive the second handling signal that may include the second stock identifier and may then query a database in memory storage 110 using the second stock identifier to associate second stock bundle 135 with second transfer order 410. As a result, system 100 may detect an association between second transfer order 410 and second processing unit 125 when processing second stock bundle 135.

System 100 may then continue in this way to detect associations between respective transfer orders and processing units. For instance, while FIG. 1 shows only two transfer orders and two processing units, many more transfer orders and/or processing units may be used in a particular application. System 100 may thus detect associations between respective transfer orders and processing units and the work is being carried out.

From stage 310, where system 100 detects associations between transfer orders and processing units, exemplary subroutine 230 may continue to stage 320 where system 100 may link transfer orders with processing unit orders. For example, based on the detected association between first transfer order 405 and first processing unit 120, system 100 may create a link between first transfer order 405 and first processing unit order 420, as shown in FIG. 4B. Each link may correspond to a work order for the respective transfer order and processing unit. First transfer order 405, first processing unit order 420, and their associated link (and/or work order) may be maintained in a database included in memory storage 110 in system 100. Similarly, based on the detected association between second transfer order 410 and second processing unit 125, system 100 may create a link between second transfer order 410 and second processing unit order 415, as shown in FIG. 4C. Second transfer order 410, second processing unit order 415, and their associated link may be maintained in a database included in memory storage 110 in system 100.

After system 100 links transfer orders with processing unit orders at stage 320, exemplary subroutine 230 may then advance to stage 330 where system 100 may remove links between the transfer orders and the initial work order. For example, based on the detected association between first transfer order 405 and first processing unit 120, system 100 may remove a link between first transfer order 405 and initial work order 400, as shown in FIG. 4B, in favor of the permanent link or work order created in stage 320. Similarly, based on the detected association between second transfer order 410 and second processing unit 125, system 100 may remove a link between second transfer order 410 and second processing unit order 415, as shown in FIG. 4C. Once system 100 removes links between the transfer orders and the initial work order in stage 330, exemplary subroutine 230 may proceed to stage 340 and return to stage 240 of method 200.

As a result, system 100 may create the final work order using initial work order 400 based on the actual detected pairings between transfer orders and processing units that processed the transfer order. While system 100 creates the final work order, the final work order's intermediate stages may used to monitor performance. For example, FIG. 4A gives an initial view, FIG. 4B gives an indication that the task is partially completed, and FIG. 4C shows the final state.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer-based method for processing stock, the method comprising:
   creating, using a processor, an initial work order comprising a plurality of transfer orders for a plurality of unassigned stock bundles, wherein the plurality of transfer orders are associated with transfers of the unassigned stock bundles by a plurality of unassigned processing units from a first area to a second area;
   receiving a handling signal sent from one of the unassigned processing units indicating that the sending unassigned processing unit is transferring an unassigned stock bundle associated with one of the transfer orders from the first area to the second area according to the transfer order, the handling signal identifying the sending unassigned processing unit;
   identifying, using the processor from the initial work order in accordance with the handling signal, the transfer order being handled by the sending processing unit based on the association between the identified unassigned stock bundle handled by the sending processing unit and a specific transfer order;
   creating, using the processor, a new work order reflecting the transfer of the unassigned stock bundle from the first area to the second area by the sending processing unit according to the identified transfer order, and associating the previously unassigned stock bundle with the sending transferring processing unit; and
   deleting, using the processor, the identified transfer order from the initial work order, when the new work order is established.

2. The method of claim 1, wherein creating the initial work order comprises adding the plurality of transfer orders to the initial work order.

3. The method of claim 2, further comprising deleting the plurality of transfer orders from the initial work order using the processor.

4. The method of claim 1, wherein the handling signal comprises a stock identifier associated with the stock bundle of the transfer order.

5. The method of claim 4, wherein the handling signal is produced using at least one of a bar code or a radio frequency identification (RFID) associated with the stock bundle of the transfer order.

6. The method of claim 1, further comprising monitoring, using the processor, the performance of the transfer order handled by the processing unit.

7. The method of claim 6, wherein monitoring the performance comprises monitoring the transfer of the at least one stock bundle associated with the transfer order by the corresponding processing unit from the first area to the second area.

8. The method of claim 6, further comprising reallocating, using the processor, one or more of the plurality of processing units based upon the monitored performance, wherein the monitored performance indicates a volume of transfer orders processed by the processing units relative to the plurality of transfer orders of the initial work order.

9. The method of claim 1, wherein at least one of the processing units is controlled by a storage facility operator.

10. The method of claim 1, wherein at least one of the processing units comprises a motorized vehicle, a non-motorized vehicle, a truck, a fork lift, a fork truck, a pallet jack, a dolly, or a hand truck.

11. The method of claim 1, wherein one or more of the plurality of stock bundles associated with the plurality of transfer orders are configured in a random placement in the first area.

12. A system for processing stock, the system comprising:
   a memory storage for maintaining a database; and
   a processor coupled to the memory storage, wherein the processor is operative to:
      create an initial work order comprising a plurality of transfer orders for a plurality of unassigned stock bundles, the plurality of transfer orders being associated with transfers of the unassigned stock bundles by a plurality of unassigned processing units from a first area to a second area;
      receive, from one of the processing units, a handling signal sent from one of the unassigned processing units indicating that the sending unassigned processing unit is transferring an unassigned stock bundle associated with one of the transfer orders from the first area to the second area according to the transfer order, the handling signal identifying the sending unassigned processing unit;
      identify, identify, from the initial work order in accordance with the handling signal, the transfer order being handled by the sending processing unit based on the association between the identified unassigned stock bundle handled by the sending processing unit and a specific transfer order;
      create a new work order reflecting the transfer of the unassigned stock bundle from the first area to the second area by the sending processing unit according to the identified transfer order, and associating the previously unassigned stock bundle with the sending transferring processing unit; and delete the identified transfer order from the initial work order, when the new work order is established.

13. The system of claim 12, wherein the handling signal comprises a stock identifier associated with the identified transfer order.

14. The system of claim 13, wherein the handling signal is produced using at least one of a bar code or a radio frequency identification (RFID) associated with the stock bundle of the identified transfer order.

15. The system of claim 12, wherein the processor is further operative to monitor the performance of of the transfer order transferred by the processing unit.

16. The system of claim 15, wherein the processor is further operative to reallocate the processing units based upon the monitored performance, wherein the monitored performance indicates a volume of transfer orders processed by the processing units relative to a volume of transfer orders of the initial work order.

17. The system of claim 12, wherein the processing units are controlled by a storage facility operator.

18. The system of claim 12, wherein at least one of the processing units comprises a motorized vehicle, a non-motorized vehicle, a truck, a fork lift, a fork truck, a pallet jack, a dolly, or a hand truck.

19. The system of claim 12, wherein the one or more stock bundles associated with the transfer orders are configured in a random placement in the first area.

20. A non-transitory computer-readable medium comprising instructions that, when executed by a processor, perform a method for processing stock, the method comprising:

creating, using a processor, an initial work order comprising a plurality of transfer orders for a plurality of unassigned stock bundles, the transfer orders being associated with transfers of the unassigned stock bundles by a plurality of unassigned processing units from a first area to a second area;

receiving, from one of the processing units, a handling signal sent from one of the unassigned processing units indicating that the sending unassigned processing unit is transferring an unassigned stock bundle associated with one of the transfer orders from the first area to the second area according to the transfer order, the handling signal identifying the sending unassigned processing unit;

identifying, using the processor from the initial work order in accordance with the handling signal, the transfer order being handled by the sending processing unit based on the association between the identified unassigned stock bundle handled by the sending processing unit and a specific transfer order;

creating, using the processor, a new work order reflecting the transfer of the unassigned stock bundle from the first area to the second area by the sending processing unit according to the identified transfer order, and associating the previously unassigned stock bundle with the sending transferring processing unit; and deleting, using the processor, the identified transfer order from the initial work order, when the new work order is established.

21. The non-transitory computer-readable medium of claim 20, wherein the handling signal comprises a stock identifier associated with the identified transfer order.

22. The non-transitory computer-readable medium of claim 21, wherein the handling signal is produced using at least one of a bar code or a radio frequency identification (RFID) associated with the one or more stock bundle of the transfer order.

23. The non-transitory computer-readable medium of claim 20, further comprising monitoring the performance of the transfer order transferred by the processing unit.

24. The non-transitory computer-readable medium of claim 23, further comprising reallocating the plurality of processing units based upon the monitored performance, wherein the monitored performance indicates a volume of transfer orders processed by the processing units relative to a volume of transfer orders of the initial work order.

25. The non-transitory computer-readable medium of claim 20, the processing units are controlled by a storage facility operator.

26. The non-transitory computer-readable medium of claim 20, wherein at least one of the processing units comprises a motorized vehicle, a non-motorized vehicle, a truck, a fork lift, a fork truck, a pallet jack, a dolly, or a hand truck.

27. The non-transitory computer-readable medium of claim 20, wherein the one or more stock bundles associated with the transfer orders are configured in a random placement in the first area.

* * * * *